United States Patent [19]
Vachon

[11] 4,165,449
[45] Aug. 21, 1979

[54] ECHO SUPPRESSOR CIRCUIT

[75] Inventor: Patrick A. Vachon, Arvada, Colo.

[73] Assignee: Storage Technology Corporation, Louisville, Colo.

[21] Appl. No.: 866,478

[22] Filed: Jan. 3, 1978

[51] Int. Cl.² ............................................. H04B 3/20
[52] U.S. Cl. .............................. 179/170.2; 179/170.6; 179/170.8
[58] Field of Search .............. 179/170.2, 170.6, 170.8, 179/1 HF, 1 VC, 170 R

[56] References Cited

U.S. PATENT DOCUMENTS

| | | | |
|---|---|---|---|
| 3,560,669 | 2/1971 | Foulkes et al. | 179/170.2 |
| 3,647,993 | 3/1972 | Foulkes et al. | 179/170.2 |
| 3,942,116 | 3/1976 | Ferguson | 179/170.6 |
| 3,973,086 | 8/1976 | May, Jr. | 179/170.2 |
| 3,985,979 | 10/1976 | Durand et al. | 179/170.6 |

OTHER PUBLICATIONS

M. J. Birck; "Improved Echo Suppression in Long Telephone Circuits"; Telephony; Mar. 29, 1971; p. 23 et seq.
P. T. Brady & G. K. Helder; "Echosuppressor Design in Telephone Communications"; Bell System Technical Journal; Nov. 1963; pp. 2893-2917.
J. W. Emling & D. Mitchell; "The Effects of Time Delay and Echoes on Telephone Conversations"; Bell System Technical Journal; Nov. 1963; pp. 2869-2891.
R. R. Riesz & E. T. Klemmer; "Subjective Evaluation of Delay and Echo Suppressors in Telephone Communications"; Bell System Technical Journal; Nov. 1963; pp. 2919-2941.

Primary Examiner—Kathleen H. Claffy
Assistant Examiner—Randall P. Myers
Attorney, Agent, or Firm—Woodcock, Washburn, Kurtz & Mackiewicz

[57] ABSTRACT

Disclosed is an echo suppressor circuit which provides a variable loss in a speaker's transmit path, which loss is a function of the relative speaker volumes. The loss provided in the path of a particular speaker is relative to the volume of the speech emanating from each speaker. In one embodiment, the amplitude of the incoming signal is reduced by an amount which is a function of the ratio of the amplitude of the incoming signal to the amplitude of the outgoing signal. Because loss is introduced into a distant speaker's transmit path rather than into his return path, it is possible for a near speaker to break into a conversation before the distant speaker has concluded. Further, since the loss provided is a function of the relative volumes of both speakers with respect to one another, the total loss introduced into the system is minimized.

11 Claims, 3 Drawing Figures

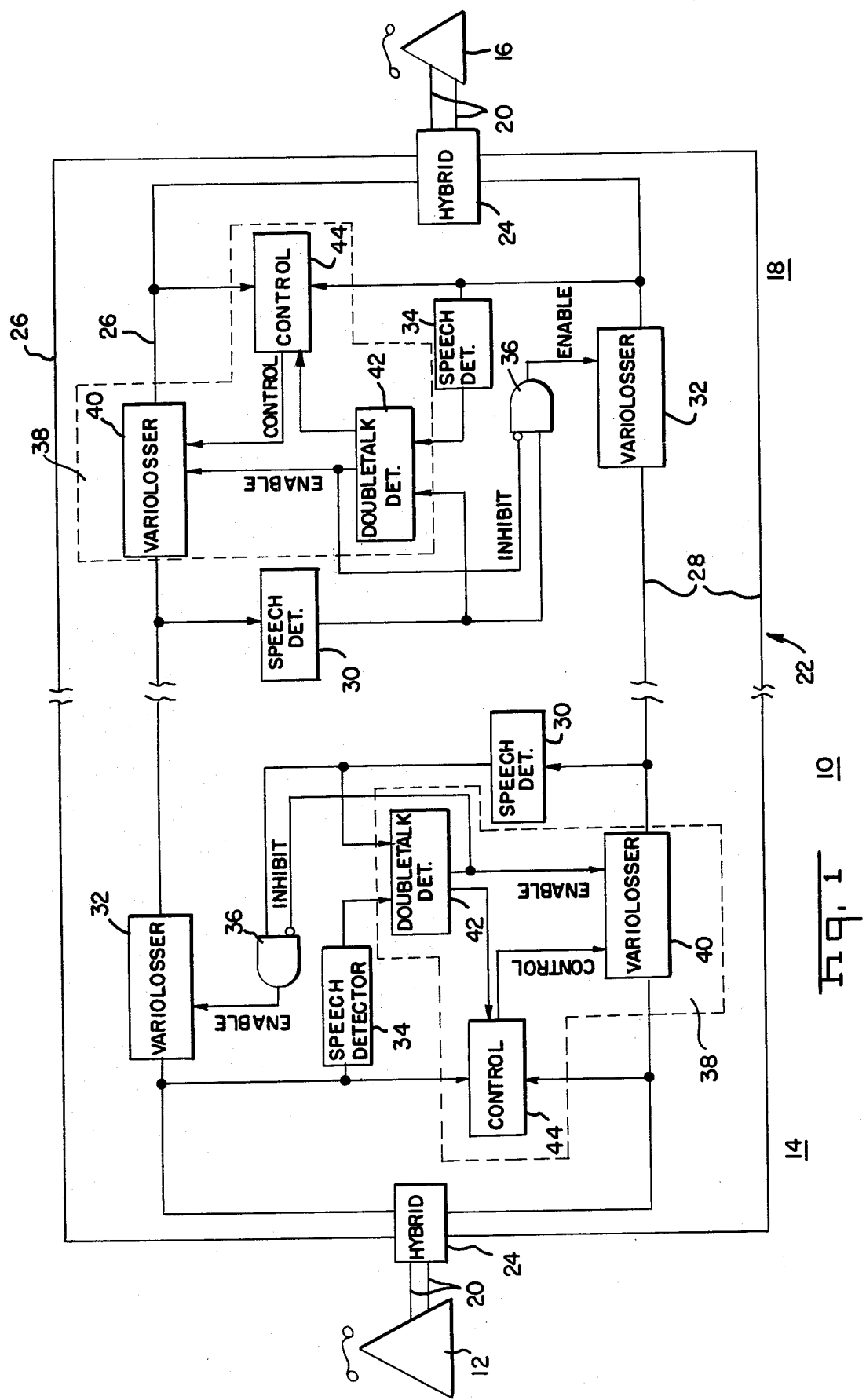

ECHO SUPPRESSOR CIRCUIT

BACKGROUND OF THE INVENTION

This invention relates in general to an echo suppressor circuit, and in particular, it relates to an echo suppressor circuit having application in a time assigned speech interpolation system.

A time assigned speech interpolation or TASI system is a high speed switching and transmission system which uses the idle time (i.e., silence) in telephone calls to interpolate the speech of two talkers on a single channel. One such system is disclosed in copending application Ser. No. 863,902, filed Dec. 23, 1977 and assigned to the assignee of the present invention. In TASI type systems such as the one disclosed therein, and in any system in which relatively long propagation delays are inherent, echos may be a problem. Further, when TASI type systems operate in a tandem arrangement, echo problems may be severe. An echo, as is well known in the art, is caused by the return of a talker's voice signal on a return path to that talker after some noticeable delay. To eliminate echo problems, the prior art has provided a wide variety of echo suppression circuits. These echo suppressors may be defined as highly sophisticated switches, including associated comparators and control circuitry which determine which party is talking and which then insert a high loss in the return path of that party.

So long as only one talker is active in a particular conversation at a particular time, the expedient of inserting high loss in the speaker's return path as a means of echo suppression is effective. However, a problem exists if both parties to a conversation attempt to speak simultaneously, a condition hereinafter referred to as "double talk." Since one party's return path is the other party's transmit path, the provision of a high loss in the return path of one party prevents the other party's speech signal from being properly transmitted, i.e., the other party's attempt to overtalk will be frustrated.

The prior art, as evidenced by the article entitled "ECHO SUPPRESSION DESIGN IN TELEPHONE COMMUNICATIONS" by P. T. Brady and G. K. Helder, The Bell System Technical Journal, November 1963, page 2893, at page 2913, has attempted to solve the problem of doubletalk by the provision of a control circuit which detects a doubletalk condition, i.e., the existence of speech in both directions. Then, this prior art echo suppressor provides a predetermined loss in the distant speaker's return path. The loss provided in the return path is a function of the amplitude of the distant speaker's signal. The disclosed system thus provides some attenuation for echoes in the doubletalk situation, while still providing both parties a chance to speak. However, this prior art solution does not take into account the relative volumes of the speech of both of the parties to a conversation. Thus, suppose the speaker at a distant location speaks at a high volume and a speaker at a near location speaks at a low volume. If both parties seek to speak at the same time, the predetermined loss inserted on the return path of the distant party in order to effectively suppress his echo, since it is proportional to the volume of his speech, may be so great as to mask the near speaker's attempt to overtalk. Moreover, even if this predetermined loss is not sufficient to mask the near speaker's attempt to overtalk, it two or more systems having such an echo suppressor circuit are operated in tandem, the cumulative effect of the loss on the return path of the distant speaker could very well mask the near talker's speech.

In the aforementioned TASI system, it is likely that two TASI systems could be linked in tandem and thus it is likely that a speaker having a weak voice would not be able to overtalk if known prior art echo suppressor circuits were used in each of the TASI links.

It is an object of the present invention to provide an echo suppressor circuit which minimizes the problem of doubletalk.

It is a further object of the present invention to provide an echo suppressor circuit which provides echo suppression and which allows each speaker to communicate when and if he desires. It is a still further object of the present invention to provide an echo suppressor circuit which minimizes the problem of doubletalk without obscuring the speech of a talker having a weak voice.

It is still a further object of the present invention to provide an echo suppressor circuit which provides effective echo suppression in time assigned speech interpolation systems which are operated in tandem.

SUMMARY OF THE INVENTION

These and other objects of the present invention are provided by a novel suppressor circuit which during doubletalk provides instead of a predetermined loss in the return path of a particular speaker, a variable loss in that speaker's transmit path which loss is a function not of solely the distant speaker's volume but of the relative speaker volumes. In other words, the loss provided in the path of a particular speaker is relative to the volume of the speech emanating from the other speaker as well as being proportional to his own speech. In one embodiment of the present invention, the amplitude of an incoming signal is reduced by an amount which is a function of the ratio of the amplitude of the incoming signal to the amplitude of the outgoing signal.

The present invention will be better understood by reference to the accompanying drawings in which:

FIG. 1 is a schematic of a telephone communication system having a pair of echo suppressor circuits at each end thereof in accordance with the present invention;

FIGS. 2A and 2B are joined at line A—A.

Figure 2A:
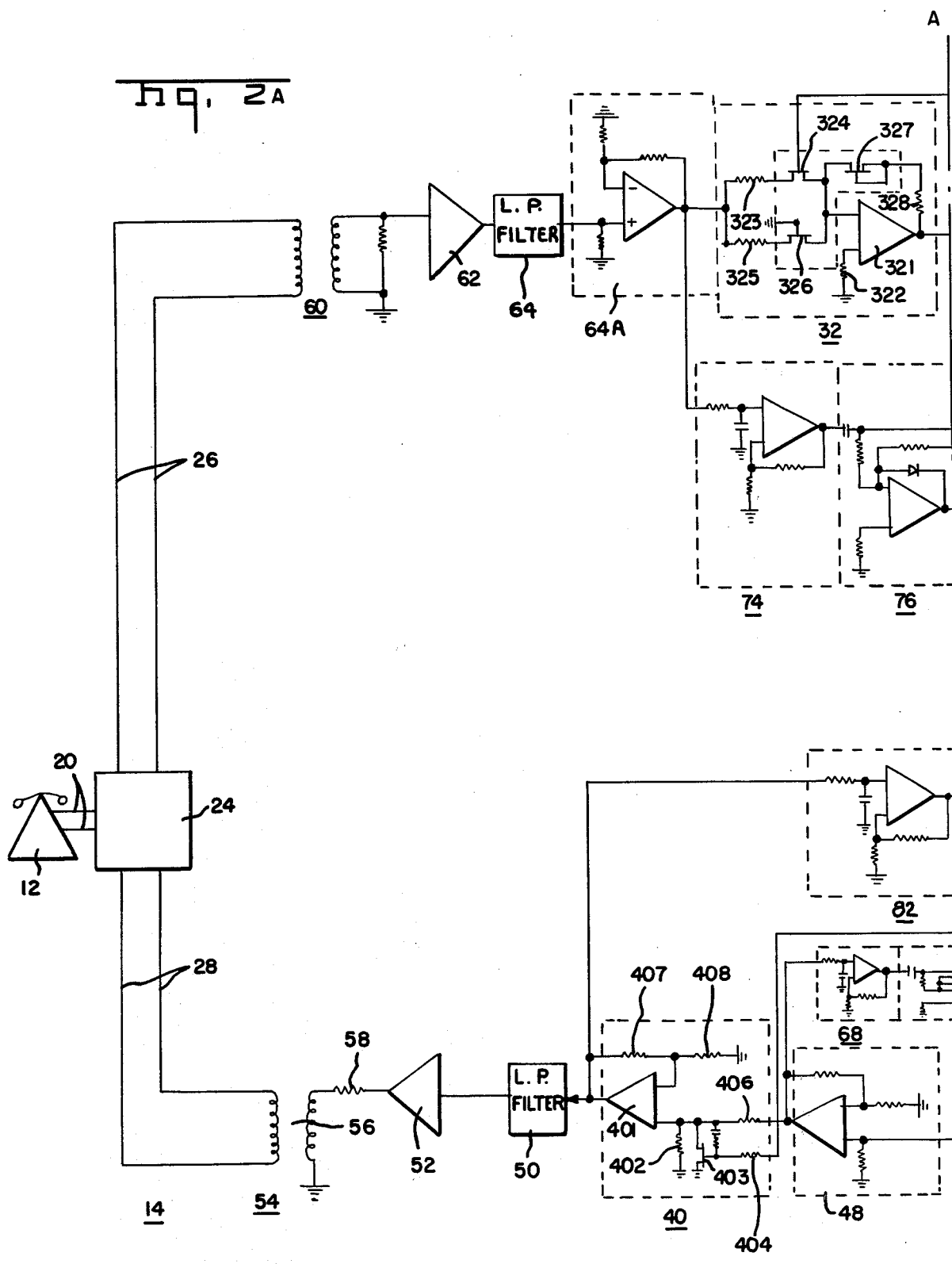
FIGS. 2A and 2B are a somewhat more detailed schematic of one terminus of the communication system shown in FIG. 1 having a single echo suppressor circuit shown therein.

Referring now to FIG. 1, a schematic diagram of a telephone communication system is shown generally at 10. The system comprises a first speech input shown as a telephone transceiver 12 found at a first location 14. The transceiver 12 is connected to a second speech input or transceiver 16 found at a second location 18 remote from the first. The transceivers 12 and 16 are interconnected by a pair of two-wire local channels 20 which are interconnected by a four-wire long distance transmission trunk 22. The transmission trunk 22 may comprise as a portion thereof a TASI system or a plurality of TASI systems connected in tandem. The two wire channels 20 are connected to the long distance transmission trunk 22 by a pair of two to four wire hybrids 24 as is well known in the art. Speech signals emanating from one of the speech inputs 12 or 16 are directed across two of the four wires of the four-wire long distance transmission trunk 22, i.e., either the path 26 or the path 28. However, as is well known in the art, whenever a four-wire circuit communicates with a two-wire circuit at a two to four wire hybrid, a finite impedance imbalance causes transmitted signals to be reflected from the hybrid toward their origin. Thus, for example, suppose first speech signals are outgoing on path 26 of the long distance transmission trunk 22 from the first location 14. This path 26 may then be defined as a transmit path to the second location 18. When this outgoing signal reaches the hybrid 24 at the second location 18, the signal will be reflected toward the first location 14 along the path 28 of the four-wire long distance transmission trunk 22 and this path 28 may then be defined as a return path.

When only a single party is speaking at any particular time, the present invention employs a well known arrangement for the suppression of echos on a return path. Accordingly, the circuit of the present invention is provided with a pair of first speech detectors 30 and a pair of first suppressor means, or variolossers 32, which are responsive to those speech detectors 30. The variolossers 32 are effective to reduce the amplitude of a reflected signal on a return path. Thus, suppose a speech signal is applied to the second speech input 16 directed toward the first location 14 along the path 28. When the signal arrives at the location 14, the first speech detector 30 responds to that signal on its arrival and the reflected signal along the path 26 is attenuated by the first suppressor means or variolosser 32 at the first location 14. The attenuation provided by the variolosser 32 is preferably fixed, and is sufficiently high to suppress any normal speech level echos.

However, it may be seen that a problem may arise if both parties seek to speak simultaneously, i.e., if the problem previously referred to as doubletalk exists. For example, suppose the aforementioned speech signal emanating from a speaker at the second location 18 arrives at the hybrid 24 at the first location 14. The reflection of this signal is attenuated by the variolosser 32 on the path 26. However, whenever the variolosser 32 is operative, outgoing speech signals from a speaker at the first location 14 will also be attenuated, and this speaker's attempt to overtalk, i.e., to speak before the other speaker has concluded, may be frustrated.

The present invention minimizes the problem of doubletalk by providing a pair of second speech detectors 34 which are responsive to outgoing speech signals at each of the locations 14 and 18. Further, a pair of secnd suppressor means 38 are provided which are responsive to both incoming and outgoing speech signals. This second suppressor means 38 comprises a second variolosser means 40, a doubletalk detector 42, and a control means 44. The second suppressor means 38 is effective during a doubletalk situation to disable the first suppressor means 32 via gate means 36 and to reduce the amplitude of the incoming signals by an amount which is a function of the relative amplitudes of both the incoming and the outgoing signals at each location. Preferably, the amplitude is reduced to an amount which is a function of the ratio of the amplitudes of the incoming signal to the amplitude of the outgoing signal. Thus, the second suppressor means 38 maintains a constant ratio between the amplitudes of the outgoing signal and the amplitudes of the echo of the incoming signal. Moreover, in the preferred embodiment if the amplitudes of the incoming signal and the outgoing signal are equal, the amplitude of the incoming signal is reduced a nominal amount below the amplitude of the outgoing signal. This nominal amount may be, for example, 25 db below the amplitude of the outgoing signal. If the amplitude of the outgoing signal exceeds the amplitude of the incoming signal, the amount of attenuation is less than the nominal amount. If the amplitude of the incoming signal exceeds the amplitude of the outgoing signal, the amount of attenuation is greater than the nominal amount.

Therefor, the amount of attenuation provided to the incoming signal is dependent not solely upon the volume of the speaker's voice at the second or distant location 18. Instead the amount of attenuation provided to the incoming signal is dependent upon the volume of both speakers' voices. Thus, if the speaker at the second location 18 has a relatively weak voice, the incoming signal is only slightly attenuated, since the outgoing signal from the other speaker, being relatively loud, will effectively mask any echo. In this way, by only slightly attenuating the incoming signal, the distant speaker's relatively weak speech is not lost. Moreover, if the distant speaker has a relatively loud voice, a great deal of attenuation is provided to allow the relatively weak voiced near speaker an opportunity to be heard and to mask the echo from the loud distant talker. Further, by disabling the first variolosser means 32 during a doubletalk condition, a speaker at the first location 14, who speaks in a low voice, will have no problem in attempting to overtalk since the amplitude of the incoming signal rather than the outgoing signal is attenuated and his transmit path is not obstructed.

Figure 2B:
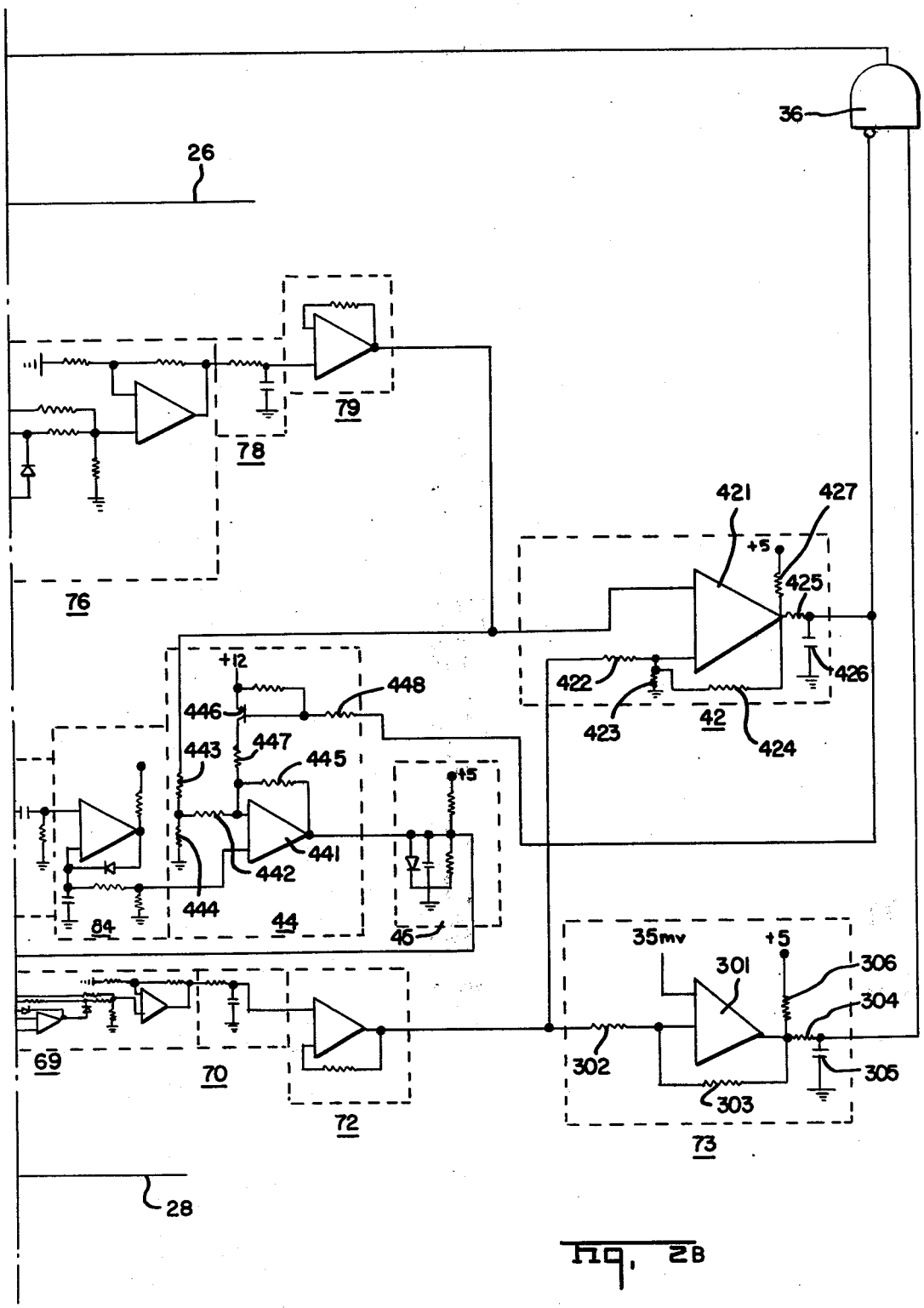

The present invention will be more fully understood by reference to FIG. 2 which illustrates one of the two echo suppressor circuits of FIG. 1, namely the one situated at the first location 14. As may be seen from FIG. 2, speech signals arriving from the second location 18 and traveling along the path 28 are amplified by the amplifier 48 and, assuming no doubletalk condition exists, are applied to a low pass filter 50, through the second variolosser 40 and then to an amplifier 52 and a first coupling means 54. The first coupling means 54, comprising a transformer 56 and a resistor 58, is connected to a two to four wire hybrid circuit 24. Incoming speech signals are received from the hybrid 24 by the transceiver 12 at the first location 14. However, due to the aforementioned impedance imbalance, the incoming speech signals are also reflected toward the second location 18 across the path 26.

The path 26 includes a second coupling means 60 in series with an amplifier 62, and a low pass filter 64. The first suppressor or variolosser means 32 is connected to the low pass filter 64. A buffer amplifier 64A amplifies the output of the low pass filter and provides buffering between the filter and variolosser 32.

The first variolosser means 32 preferably comprises an amplifier 321, the non-inverting input of which is connected through resistor 322 to ground. Outgoing speech signals and incoming speech signals which have been reflected are applied to the inverting input of the amplifier 321 through a network comprised of two branches. The first branch comprises a resistor 323 in series with a field effect transistor 324. The second branch, which is parallel to the first, comprises a resistor 325 in series with a field effect transistor 326. The gate contact of the field effect transistor 324 is connected to the gating means 36 as will be more fully described below, while the gate contact of the field effect transistor 326 is connected to ground, holding transistor 326 on. The amplifier 321 further employs a feedback loop comprising a field effect transistor 327, the gate and drain of which are shorted and a resistor 328.

The variolosser 32 is responsive to the first speech detector 30 as mentioned above. The first speech detector 30 (FIG. 1) is comprised of the series combination of a bandpass filter 68, a full wave detector 69, a low pass filter 70, a buffer 72, and a threshold detector 73. The threshold detector 73 comprises a comparator 301. The incoming speech signals are applied to the non-inverting input of the comparator 301 through a resistor 302. Further, the non-inverting input is connected to the output of the comparator 301 by a feedback resistor 303 which provides the comparator 301 with a small amount of hysteresis. The inverting input of the comparator 301 is connected to a 35 millivolt reference or threshold level as shown. The output of the comparator 301 is applied to an RC circuit comprising a resistor 304 and a capacitor 305. Further, the output is connected to a positive voltage source through a resistor 306. The voltage across the capacitor 305 is applied to the gate means 36. In a preferred embodiment, the threshold level is such that incoming signals having an amplitude greater than for example $-46$ db are identified as incoming speech signals by the first speech detector 30. When speech is detected by the speech detector 30, the aforementioned gating means 36 is effective to enable the first variolosser 32 if a doubletalk condition does not exist by providing a voltage to the gate contact of the field effect transistor 324.

However, in the event a speaker at the first location 14 attempts to overtalk, the doubletalk detector 42 will be activated to reduce the amplitude of an incoming speech signal and to disable the first variolosser 32.

Whenever a speaker attempts to overtalk, the outgoing speech signal is applied to the doubletalk detector 42 through a second speech detector 34 (FIG. 1). The second speech detector 34 is comprised of the series combination of a bandpass filter 74, a full wave detector 76, a low pass filter 78 and a buffer 79.

The doubletalk detector 42 comprises a comparator 421. The outgoing signals which have been identified as speech are applied to the inverting input of the comparator 421 while incoming speech signals are applied to the non-inverting input through a resistor divider 422 and 423. Further, the comparator 421 contains a feedback loop containing a resistor 424. The output of the comparator 421 is applied across an RC circuit comprising a resistor 425 and a capacitor 426 which has been biased by a positive voltage source through a resistor 427. This output is applied to the first gate means 36 such that when the doubletalk detector 42 responds to a doubletalk condition, the first variolosser 32 is disabled. Further, the output of the doubletalk detector 42 is applied to the aforementioned control means 44.

The control means 44 controls the attenuation of the incoming signal on path 28 through the action of the second variolosser means 40. Variolosser means 40 comprises an amplifier 401 having a gain which is variable between 0 and 1 and the gain is under the control of the control means 44. Incoming signals are applied to the amplifier 401 through a resistor 406. The non-inverting input of the amplifier 401 is connected to ground by the parallel combination of a resistor 402 and a field effect transistor 403. The gate contact of the field effect transistor 403 is connected by a resistor 404 to the output of the control means 44 through a loop response filter shown as 45. The output of the amplifier 401 is further connected to the control means 44 through the bandpass filter 82 and the peak detector 84. Further, the amplifier 401 employs a feedback loop comprising resistors 407 and 408. This feedback loop also contains a control means 44.

The control means 44 comprises a differential amplifier 441. The amplifier 441 employs a feedback resistor 445. The non-inverting input of the amplifier is connected to the peak detector 84. The inverting input is connected by a resistor 442 to a voltage divider circuit comprising resistors 443 and 444 connected to the outgoing speech detector buffer 79. Further, the inverting input is connected to a positive voltage source through a transistor 446 in series with a resistor 447. The base of the transistor 446 is connected by a resistor to the doubletalk detector 42. Thus, the input to the control means is a function of the ratio of the amplitude of the incoming signal to the amplitude of the outgoing signal and is controlled by the doubletalk detector 42. Further, if these amplitudes are equal, the input to the amplifier 441 is a nominal value defined by the voltage divider comprising resistors 443 and 444.

Thus, when the incoming and outgoing signals have equal amplitudes, the variolosser 40 attenuates the incoming signal by a nominal amount as determined by the voltage divider comprising resistors 443 and 444. When the amplitude of the incoming signal exceeds the amplitude of the outgoing signal, this amount of attenuation exceeds the nominal amount. As the variolosser 40 attenuates the incoming signal, the output of the control means 44 decreases. This, in turn, reduces the input of the control means 44 which decreases until the nominal amount of attenuation is reached. Further, if the amplitude of the outgoing signal exceeds the amplitude of the incoming signal, the attenuation provided by the variolosser 40 is less than the nominal amount, and this attenuation increases as the difference between the amplitudes decreases.

While a particular embodiment has been shown and described, it will, of course, be understood that various modifications may be made without departing from the principles of the invention. The appended claims are, therefore, intended to cover any such modifications within the true spirit and scope of the invention.

What is claimed is:

1. An echo suppressor circuit of the type having:
   a speech transceiver at a first location;
   a transmit path extending from a second location remote from the first to said first location for directing an incoming speech signal from said second to said first location;
   a return path, separate from said transmit path, extending from said first to said second location for directing outgoing speech signals from said first to said second location, said incoming speech signals being reflected from said first to said second location along said return path;
   a first speech detector responsive to the presence of incoming speech signals on said transmit path; and
   a first suppressor means responsive to said first speech detector for reducing the amplitude of said reflected signal when said incoming signal is present on said transmit path, the improvement comprising:
   a second speech detector responsive to the presence of outgoing signals on said return path;
   means responsive to said second speech detector inhibiting said first suppressor means when said outgoing signal is present on said return path; and a second suppressor means responsive to both said incoming and outgoing signals and to both said first and said second speech detector for reducing the amplitude of said incoming signal by an amount which varies as a function of the relative amplitudes of said incoming and outgoing signals with respect to one another whenever said incoming and outgoing signals are simultaneously occurring.

2. The echo suppressor of claim 1 wherein said second suppressor means reduces said amplitude to a nominal value below the amplitude of said outgoing signal whenever the amplitude of said outgoing signal and the amplitude of said incoming signal are equal.

3. The echo suppressor circuit of claim 2 wherein said amount is greater than said nominal value whenever said amplitude of said incoming signal exceeds the amplitude of said outgoing signal.

4. The echo suppressor circuit of claim 2 wherein said amount is less than said nominal value whenever said amplitude of said outgoing signal exceeds the amplitude of said incoming signal.

5. The echo suppressor circuit of claim 3 wherein said amount decreases as the difference between said amplitudes decreases until said nominal value is attained.

6. The echo suppressor circuit of claim 4 wherein said amount increases as the difference between said amplitudes decreases.

7. The echo suppressor circuit of claim 1 wherein said second suppressor means reduces said amplitude by an amount which is a function of the ratio of the amplitude of said incoming signal to the amplitude of said outgoing signal.

8. The echo suppressor circuit of claim 1 wherein said second suppressor means comprises:
a means for detecting the simultaneous occurrence of said incoming and said outgoing signals;
a control means responsive to said detecting means, said control means producing an output proportional to the ratio of the amplitude of said incoming to said outgoing signals; and
an amplifier situated in said transmit path responsive to said control means the gain of which is variable between 0 and 1.

9. The echo suppressor circuit of claim 8 wherein said amplifier has a feedback loop and wherein said control means comprises a second amplifier situated within that loop.

10. The echo suppressor circuit of claim 9 wherein the gain of said second amplifier is controlled by the output of said detecting means.

11. The echo suppressor circuit of claim 10 wherein said gain of said second amplifier is a nominal gain whenever the amplitudes of said outgoing signal and said incoming signal are equal.

* * * * *

UNITED STATES PATENT AND TRADEMARK OFFICE
CERTIFICATE OF CORRECTION

PATENT NO. : 4,165,449
DATED : August 21, 1979
INVENTOR(S) : Patrick A. Vachon

It is certified that error appears in the above-identified patent and that said Letters Patent are hereby corrected as shown below:

Col. 1, line 66, after "overtalk", delete "it" and insert therefor --if--;

Col. 3, line 47, after "a pair of", delete "secnd" and insert therefor --second--;

Col. 6, line 14, insert --448-- after "resistor".

Signed and Sealed this

First Day of January 1980

[SEAL]

Attest:

SIDNEY A. DIAMOND

Attesting Officer

Commissioner of Patents and Trademarks

Disclaimer

4,165,449.—*Patrick A. Vachon*, Arvada, Colo. ECHO SUPPRESSOR CIRCUIT. Patent dated Aug. 21, 1979. Disclaimer filed Sept. 11, 1981, by the assignee *Storage Technology Corp.*

Hereby enters this disclaimer to claims 1–7 of said patent.

[*Official Gazette September 21, 1982.*]